United States Patent Office 3,563,782
Patented Feb. 16, 1971

3,563,782
WRITING SURFACE AND INK COMPOSITION FOR MARKING THEREON
Isaiah U. Liberman, Los Angeles, Jerome A. Woolf, Beverly Hills, and Raymond D. Atchley, Los Angeles, Calif., assignors to Gamco, Inc., Big Spring, Tex., a corporation of Texas
No Drawing. Continuation of application Ser. No. 572,900, Aug. 17, 1966, which is a continuation-in-part of application Ser. No. 281,773, May 20, 1963. This application July 31, 1969, Ser. No. 849,252
Int. Cl. B43l 1/12; B44d 1/22
U.S. Cl. 117—37
16 Claims

ABSTRACT OF THE DISCLOSURE

A pigmented sheet of polyethylene plastic having a density in the range of about 0.95 to about 0.96, having a uniform, substantially smooth, non-glossy surface, and having minute indentations in the surface causing the surface to receive and retain an ink marking composed of a plurality of essentially dry dye particles which adhere to the surface of the sheet but which may be readily removed therefrom by light mechanical abrasion.

This application is a continuation application of our copending application Ser. No. 572,900 filed Aug. 17, 1966, now abandoned which was a continuation-in-part of our copending application Ser. No. 281,773, filed May 20, 1963, now abandoned.

This invention relates to a plastic surface having markings thereon made with a removable ink, and is particularly concerned with a novel article in the form of a plastic sheet having markings thereon composed of dye particles which are deposited upon such surface by applying thereto a novel ink composition which dries quickly and precipitates the dry dye particles on the plastic surface to form said markings, said markings being readily removable from such surface, e.g. by a soft wiping paper or cloth.

Conventional blackboards on which markings are made by means of chalk have certain disadvantages. These include the noise and scratchiness inherent in applying or writing with chalk on a blackboard, the dust which is produced by the crumbling of the chalk against the blackboard surface, and the messy condition of the blackboard after the chalk markings have been erased using a conventional, e.g. felt eraser.

It is an object of this invention to provide an article comprising a white or colored writing surface, preferably of an essentially white color, having surface characteristics permitting said surfaces to receive and retain ink markings, said surface having contrasting colored markings thereon composed of easily removable dry particles of coloring or dye, from which substantially all solvent has been removed.

Another object of the invention is the provision of a novel ink or coloring composition especially adapted for easy application to a white or colored, preferably a substantially white, writing surface, to produce contrasting colored ink markings thereon, and which dries readily to deposit on said surface a multiplicity of dye particles substantially free of solvent, corresponding to said ink markings.

Other objects and advantages will be apparent from the following description of the invention.

According to the invention, it has been found that by applying to a substantially white writing surface, preferably formed of a plastic, e.g. polyethylene resin, and which has a smooth, uniform, but non-glossy surface, an ink consisting essentially of a dye, which may be spirit soluble or water soluble, in a solvent system having low surface tension and in which the dye has limited solubility, as the last traces of solvent evaporate, the dye precipitates out of the ink, forming discrete particles of dye at the loci of the ink markings, substantially free of solvent, and forming film corresponding to the ink markings which is adherent to the writing surface or whiteboard by means of a conventional felt-tip marking pen. Since the ink composition of the invention is free of the type of resins usually incorporated in conventional ink formulations for the purpose of conferring strength and adhesion on the dried ink so that it can resist abrasion, the dried solvent-free particles of ink formed on the colored, e.g. white, writing surface or "whiteboard" of the invention, on the contrary, do not resist such abrasion, and are readily removed or eraser from the colored writing surface by means of soft wiping paper or cloth.

The instant invention has the advantages that the application of the ink to the colored, e.g. white, writing surface is essentially noiseless and dustless, in contrast to application of chalk markings to a blackboard. Further, by means of the invention, very sharp brilliantly colored markings are provided on a differently colored writing surface, e.g. a white surface, and these markings are easily erased, leaving a relatively clean cheerful surface, which is not messy and which is free of diffuse markings, in contrast to the use of chalk on a blackboard. A further advantage of the invention is that a white writing surface, according to the invention, can be used as a projection screen to project maps, graphs, and the like, upon which the lecturer can add data or markings by means of the ink composition hereof, and then readily remove such added information before the next slide is shown.

The writing surface on which ink markings preferably are made according to the invention, consists of a flat surface or sheet of a plastic pigmented to the desired color with a suitable pigment. A preferred form of plastic for this purpose is polyethylene, particularly high density polyethylene, e.g. having a density between about .950 and about .960. The surface finish of the plastic sheet on which writing is performed should be very uniform and smooth but not glossy. A special finish prepared as hereinafter described is preferred so as to permit the plastic surface to receive and be wetted by the ink used in marking such surface. If desired, other plastics including low density polyethylene, polypropylene, polyvinyl chloride, Teflon (polymeric tetrafluoroethylene), Saran (polyvinylidene chloride), and the like, can be used.

Any suitable pigment for producing the desired color of the plastic, e.g. polyethylene, can be utilized. These include, for example, titanium dioxide (white pigment), chrome yellow, cadmium yellow, chrome green, phthalocyanine green, and the like, and mixtures thereof, e.g. including titanium dioxide, for producing a desired intermediate color shade. However, a writing surface in the form of a white pigmented plastic is the preferred type of writing surface employed in the invention. If desired, the plastic sheet can be made with an adhesive backing for easy application of the sheet onto a supporting surface, for example, a conventional blackboard.

The preparation and conditioning of the writing surface of the plastic sheet is a matter of importance.

In forming and conditioning the plastic sheet it is extruded between rollers in pressure relationship. One side of the sheet is exposed to a polished surface of a metal roller, such as a chrome roller, so that it has a glossy finish which is normally the so-called "good" side of the sheet. The other side is relatively rough and unfinished and has minute pits and indentations on the surface thereof.

The sheet is secured to a suitable backing to support same with unfinished side exposed. The exposed surface is then slowly passed under a high speed rotating buffer with the buffer in pressure contact therewith. Preferably the buffer consists of a rotary brush having bristles made of relatively soft, flexible, tough material, such as sisal hemp. The bristles of the brush should be of such texture and spacing that when they are pressed against the surface and rotated as high speed they will generate enough heat from friction to burnish the surface of the plastic sheet and cause the glazing and sealing of the pores and indentations in the surface of the sheet without imparting a glossy sheen thereto and without burning same. Thus the surface is sealed to prevent absorption of ink without imparting to the writing surface an objectionable sheen having a high light reflectance characteristic which would be unsatisfactory for use as a projector screen and writing surface.

The ink composition of the invention including a major proportion of a solvent, or plurality of solvents, and a minor proportion of a dye, should have a low surface tension with respect to the plastic surface to which it is applied, sufficient to wet the surface and form a distinct sharp marking thereon, but should not be so low as to have a substantially zero angle of contact with the plastic marking surface, to avoid undesirable spreading of the inked mark. The ink must be absolutely free of all resin binders that would cause it to adhere tenaciously to the surface of the plastic sheet. For polyethylene plastic marking surfaces, it has been found, for example, that the surface tension of the ink, and of the organic solvent or solvents contained therein, should be not more than about 30 dynes per centimeter at room temperature (about 70° F.) in order to wet the polyethylene, preferably between about 20 and about 30 dynes per cm. at room temperature. This limits the type of solvents employed to those which have suitable low surface tension for purposes of the invention. Thus, for example, ethyl Cellosolve, having a surface tension of about 28 dynes per cm. at room temperature, is suitable in this respect as a solvent for an ink which can be used for marking polyethylene according to the invention. Where inks or solvents of lower surface tension are provided, these may be employed for marking on low density plastic materials such as Teflon. The ink preferably should be of a low viscosty, e.g. between about 1 and about 25 centipoises at room temperature, in order to permit it to flow fast enough through the felt nib of the conventional marking pen.

The solvents employed in the ink composition of the invention should have a sufficiently high vapor pressure such that the ink will dry in a relatively short time, yet sufficiently low that it will not dry out in the marker, that is, in the conventional felt tip marking pen. Preferably such solvents should have a vapor pressure between about 1 and about 20 mm. mercury pressure at room temperature. As an important feature of the ink provided according to the invention, the dye and solvent system employed is such that the dye has a limited or terminal solubility in the solvent. That is, the dye is highly soluble in the solvent, but in a matter of seconds, e.g. 30 seconds, after application of an ink mark to the above described plastic surface, during which time the major portion of the solvent has evaporated from the ink, the concentration of the dye in the remaining solvent reaches the terminal solubility of the dye in the solvent, and the dye precipitates out of solution practically in a dry form. Thus, as the last traces of solvent evaporate from the ink mark, the dye passes directly into a powder form and a substantially non-continuous film of essentially discrete closely spaced dye particles is formed, sharply defining the ink mark applied to the plastic surface, although to the naked eye, the resulting dry ink mark appears to be continuous.

Since there is no adherent binder present in the ink formulation of the invention, an abrasive-resistant film is not formed, but rather a dry powdery film is formed, the discrete particles of which cake together or cohere to some extent. Although such dye particles contain practically no remaining solvent, there are still slight traces of solvent present, and this factor, in conjunction with the small size of the particles, e.g. of the order of about 5 to about 25 microns, cause sufficient adherence of the substantially dry dye particles to the marking surface without dusting from such surface. There may also be some electrostatic adhesion between the dry dye particles and the plastic marking surface, tending to prevent such particles from falling off such surface. However, the powdery film precipitated from the ink of the invention is readily removale from the treated and buffed, e.g. white, plastic marking surface by lightly wiping the powdery markings with an eraser or soft tissue sheet, without the use of any solvent. This is in contrast to ink markings formed from conventional inks containing a resin, and which are gelatinous highly tenacious films which resist erasure except by abrasion of the plastic surface.

Although an ordinary felt blackboard eraser can be used to remove ink markings made on the colored plastic surface employing an ink according to the invention, this type of eraser is undesirably dusty and becomes clogged rapidly. A more desirable type of eraser for this purpose is a soft wiping paper such as used for paper napkins, paper towels, toilet tissue, and the like. This material can be used in the form of a pad or a roll in conjunction with a mechanical holder that enables a fresh surface to be presented for erasing whenever a used portion of the paper becomes clogged. Various chemical agents such as silicones, fluorocarbons, waxes and oils, can be impregnated in the paper to enable the plastic writing surface to be more susceptible to removal of the dry ink markings of the invention. A soft rag may also be employed as an eraser for this purpose. If desired, a suitable solvent can be applied to such marking surface for cleaning the surface after an extended period of use, in order to remove any stubborn ink traces or stains. An example of such a solvent is one composed of about 50% isopropyl alcohol and about 50% trichloroethylene.

In order to provide an ink according to the invention, wherein the dye has a limited or terminal solubility therein to produce the dye precipitate from the ink markings as described above, a single solvent having the characteristics previously described, that is, high vapor pressure, low viscosity, and proper solvent characteristics with respect to the dye so as to permit precipitation thereof after evaporation of most of the solvent, can be employed. However, in order particularly to provide the last mentioned important property, a plurality of solvents can be used, e.g. two solvents. In the latter case, one of the solvents preferably is of a type in which the dye is highly soluble, and used in major proportion, and the second solvent is one in which the dye is practically insoluble, and usually employed in minor amount. Under these conditions the second solvent must have a lower vapor pressure than the first or main solvent so that the second solvent is the last solvent to evaporate, such second solvent, however, also having a relatively high vapor pressure. Also, the second solvent must be of a type which does not cause the dye to precipitate in the bulk ink.

The most suitable solvents for inks according to the invention, are the glycol ethers, for example, (ethylene glycol monoethyl ether( ethyl Cellosolve), ethylene glycol monomethyl ether (methyl Cellosolve)), and propylene glycol monomethyl ether (marketed as "Dowanol PM"), These solvents are satisfactory without further modification, that is, they can be used as the sole solvent, with certain dyes. The amount of solvent utilized may range from about 75 to about 98% by weight of the ink.

The best solvents presently known for use in a dual solvent system including one of the above listed solvents, for facilitating precipitation of the dye from the ink, are the pentanones and pentanols, particularly 4-methoxy-4-methyl pentanone-2 (marketed as "Pent-Oxone"), and 4-methoxy-4-methyl pentanol-2 (marketed as "Pentoxol"). Other solvents for this purpose are diacetone alcohol, ethylene glycol monoethyl ether acetate, ethyl amyl ketone, and aromatic solvents such as xylene, or commercial aromatic petroleum cuts above toluene in boiling point such as the material marketed as "Cyclosol." In inks containing such dual solvent systems, the relative proportions of the two types of solvents employed therein can be varied, usually depending chiefly on the particular dye present, the solvent in which the dye has high solubility generally being present in major proportion, as previously indicated. Thus, for example, in inks containing such dual solvent systems, the solvent in which the dye has high solubility, for example, ethyl Cellosolve, can be employed generally in an amount ranging from about 40 to about 95% by weight of the ink, and the solvent in which the dye has very low solubility, for example, Pentoxol, can be employed generally in an amount ranging from about 5 to about 40% by weight of the ink. The total amount of solvent in an ink containing such a dual solvent system may range from about 75 to about 98% by weight of the ink.

The solvent system should consist of a member in the range of about 10 to about 90% by weight which is chosen from a group consisting of ethylene glycol monomethyl ether and a second member in the range of about 10 to about 90% by weight based on the solvent system which second member is chosen from the group consisting of 4-methoxy-4-methyl-pentanol-2 and 4-methoxy-4-methyl-pentanone-2.

Where dyes which are water soluble are employed in the ink, a substantial amount of water, e.g. up to 70% by weight, can be present in the ink. In other words, the amount of water in the ink composition may range from 0 to about 70% by weight. However, where water is employed, there is always employed, in conjunction therewith, some organic solvent of the types above described. The total amount of solvent in such a system, including both water and organic solvent, preferably is in the above mentioned range of about 75 to about 98% by weight of the ink. The amount of water employed is such that the resulting solvent system still has sufficiently high vapor pressure to provide rapid drying of the ink.

Particularly where large amounts of water are used, with relatively small amounts of organic solvent, a wetting or surface active agent is added to aid in reducing the surface tension to the required level noted above, so as to properly wet the plastic, e.g. polyethylene, marking surface. Typical examples of such a wetting agent is that marketed as Pluronic L-64, which is a polyglycol blocked copolymer, and that marketed as Mironol DM, and which is the sodium salt of stearic acid substituted quaternary hydroxy cycloimidinic acid alcoholate. However, in the preferred ink compositions of the invention, it is preferred not to include water and to employ only organic solvents as described above, since the presence of water presents a surface tension problem and also a drying problem.

Small amounts of materials may be added to the ink to lower viscosity and speed up drying, if desired. Thus, for example, a small amount of isopropyl alcohol e.g. about 5 to about 15% by weight of the ink, can be employed for this purpose.

Almost any of the spirit-soluble dyes can be incorporated in the ink according to the invention. Examples of such dyes are the following, the color index numbers employed being taken from 1957 Technical Manual, "Yearbook of the American Association of Textile Chemists and Colorists:"

Spirit Nigrosine SSB—Color Index 864
Spirit Soluble Fast Blue RBF—Prototype 40
Luxol Fast Red B—Solvent Red 33
Spirit Soluble Fast Red 3R
Luxol Fast Red L
Spirit Soluble Fast Red 2G Also, a number of water-soluble dyes that have some alcohol solubility may be used. These dyes have the added advantage of being washable. Typical examples of such dyes are as follows, again using color index numbers based on the above identified authority:

Calcocid Ink Blue G—Color Index 707
Nigrosine WSB No. 50—Color Index 865
Croceine Scarlet SS—Color Index 252
Brilliant Pontacyl Blue—Prototype 40

If desired, two or more dyes can be mixed to obtain the exact shade of color desired.

The amount of dye or dyes employed in the ink according to the invention can be varied, usually employing a minor percentage of the dye being utilized, by weight of the ink. Generally the amount of dye employed can range from about 2 to about 25% by weight of the ink.

The following are examples of ink compositions according to the invention:

EXAMPLE 1.—COMPOSITION A

| Color | Ingredients | Range, percent | Optimum, percent |
| --- | --- | --- | --- |
| Black | Nigrosine SSB | 10–20 | 15 |
| | Ethyl Cellosolve | 45–80 | 60 |
| | Pentoxol | 10–35 | 25 |

EXAMPLE 2.—COMPOSITION B

| Color | Ingredients | Range, percent | Optimum, percent |
| --- | --- | --- | --- |
| Blue | Spirit Soluble Fast Blue RBF | 5–10 | 7.5 |
| | Ethyl Cellosolve | 55–85 | 67.5 |
| | Pentoxol | 10–35 | 25 |

EXAMPLE 3.—COMPOSITION C

| Color | Ingredients | Range, percent | Optimum, percent |
| --- | --- | --- | --- |
| Red | Spirit Fast Red 3R | 10–20 | 20 |
| | Ethyl Cellosolve | 80–90 | 80 |

EXAMPLE 4.—COMPOSITION D

| Color | Ingredients | Percent |
| --- | --- | --- |
| Black | Nigrosine SSB | 20 |
| | Methyl Cellosolve | 70 |
| | Pent-Oxone | 10 |

EXAMPLE 5.—COMPOSITION E

| Color | Ingredients | Percent |
| --- | --- | --- |
| Black | Nigrosine WSB No. 50 | 20 |
| | Water | 65 |
| | Pentoxol | 14 |
| | Pluronic L-64 | 1 |

EXAMPLE 6.—COMPOSITION F

| Color | Ingredients | Percent |
| --- | --- | --- |
| Black | Nigrosine WSB No. 50 | 15 |
| | Water | 20 |
| | Methyl Cellosolve | 65 |

EXAMPLE 7.—COMPOSITION G

| Color | Ingredients | Percent |
| --- | --- | --- |
| Black | Nigrosine WSB No. 50 | 10 |
| | Water | 40 |
| | Methyl Cellosolve | 40 |
| | Pentoxol | 10 |

The following are examples of application of the ink formulations of the above examples to a plastic writing surface, to form ink markings on such surface according to the invention.

EXAMPLE 8

The ink composition A of Example 1 is used to form markings on a high density white polyethylene sheet pigmented with titanium dioxide pigment, by stroking the ink onto the polyethylene sheet surface by means of a felt-tip marking pen containing the liquid ink composition. About 30 seconds after the ink markings were applied to the polyethylene plastic sheet, dry sharp black markings were observed on the plastic sheet, which were not dusty and the particles of such markings remained on the sheet surface without dusting off or falling from such surface. The markings were then readily removed from the polyethylene sheet surface by lightly erasing the markings with an eraser in the form of a holder having an erasing surface formed of a soft paper. The surface of the polyethylene sheet following removal of the ink markings was clean and dustfree, with no apparent smudges or stains.

EXAMPLE 9

The procedure of Example 8 is repeated employing instead of ink composition A of Example 1, ink compositions B and C of Examples 2 and 3, respectively, to form sharp blue and sharp red markings on the polyethylene sheet, such as markings being readily removable by simple erasing, as described above in Example 8.

EXAMPLE 10

The procedure of Example 8 is repeated except that instead of the white polyethylene sheet, a marking surface composed of a high density polyethylene sheet pigmented with a yellow pigment composed of a mixture of chrome yellow and titanium dioxide, is used, in conjunction with the ink composition A of Example 1. Sharp black dustless markings on the yellow polyethylene sheet are obtained, which are readily removed by an eraser as described in Example 8, leaving the clean polyethylene marking surface.

EXAMPLE 11

The procedure of Example 8 is repeated except that instead of the white polyethylene sheet, a white polypropylene sheet pigmented with titanium dioxide is employed and ink markings are made thereon with Composition A of Example 1. Sharp black markings are formed on the polypropylene sheet, which are removable by light erasing of the polypropylene marking surface.

From the foregoing, it is apparent that the invention provides a novel article in the nature of a plastic, preferably white, marking surface, on which are applied in a noiseless manner ink markings which are sharp, dustfree and adherent to the marking surface, yet which can be removed readily by a simple erasing operation to present a clean fresh surface on which further ink markings can be made, and also provides a novel ink composition especially designed to provide dry markings on such plastic surfaces in a very short time after application of the ink to such surface, and having the above noted characteristic of being readily removable, when desired, from the plastic marking surface.

While we have described particular embodiments of our invention for purposes of illustration, it should be understood that various modifications and adaptations thereof may be made within the spirit of the invention, as set forth in the appended claims.

We claim:

1. An article comprising a pigmented sheet of polyethylene plastic having a density in the range of about 0.95 to about 0.96 having a uniform, substantially smooth, non-glossy impervious surface, and the surface being adapted to receive and retain an ink marking, and a colored ink mark on said sheet of a color different from the color of the pigmented sheet, said mark composed of a plurality of essentially dry dye particles adherent to the surface of said sheet, but readily removable therefrom by light mechanical abrasion.

2. The combination called for in claim 1 wherein the surface of the polyethylene sheet has minute pits and indentations sealed thereon to provide a surface suitable for use as a movie projection screen.

3. The combination called for in claim 1 wherein the surface of the polyethylene sheet has minute burnished pits and indentations in the surface thereof to provide a surface which is non-absorbent to ink and adapted such that the essentially dry dye particles will lightly adhere thereto.

4. An article comprising a pigmented sheet of polyethylene plastic having a density in the range of about 0.95 to about 0.96, having a uniform, substantially flat, impervious, non-glossy surface of a preselected color, said surface having sealed pores thereon; and a colored ink mark on said surface of said sheet of a color different from said preselected color, said mark composed of a plurality of essentially dry dye particles lightly adherent to said surface, but readily removable therefrom by light mechanical abrasion by an eraser of softer material than the surface so as not to cut away or scratch the surface.

5. An article as defined in claim 4, wherein said plastic sheet is a white pigmented polyethylene sheet.

6. An article as defined in claim 4, wherein said plastic sheet is a white pigmented polyethylene sheet, and said mark is colored black.

7. An article comprising a pigmented sheet of polyethylene plastic, having a uniform substantially smooth, non-glossy, impervious surface of a preselected color, said surface having sealed indentations thereon; and a colored ink mark on said surface of said sheet of a color different from said preselected color, said mark composed of a substantially non-continuous powdery film formed from a plurality of essentially discrete dry coherent dye particles of small size, said particles being lightly adherent to said sheet, but readily removable therefrom by light mechanical abrasion by an eraser of softer material than the surface so as not to cut away or scratch the surface.

8. An article as defined in claim 7 wherein said plastic sheet is a white pigmented plastic sheet.

9. An article comprising a pigmented sheet of polyethylene plastic of a preselected color having a density in the range of about 0.95 to about 0.96, having a uniform, smooth, non-glossy surface, and adapted to receive and retain an ink marking; and a colored ink mark on said sheet of a color different from said preselected color, said mark composed of a plurality of essentially dry dye particles of a size of the order of about 5 to about 25 microns, said particles being lightly adherent to said sheet, but readily removable therefrom by light mechanical abrasion by an eraser of softer material than the surface so as not to cut away or scratch the surface.

10. An article as defined in claim 9, wherein said plastic sheet is a white pigmented polyethylene sheet, pigmented with titanium dioxide.

11. An article comprising a high density plastic sheet of a preselected color having a uniform, substantially smooth, non-glossy burnished surface on the unfinished side thereof, said surface being impervious to specially formulated ink markings; and an ink marking on said surface of a different color than the sheet; said ink marking comprising a plurality of dye particles suspended in a volatile solvent system having a low surface tension and a high vapor pressure, such that upon the evaporation of the solvent the dry dye particles lightly adhere to the surface, but are easily removable therefrom by wiping same with a soft eraser material of softer material than the surface so as not to scratch or cut away the surface.

12. The combination called for in claim 11 wherein the plastic sheet is polyethylene.

13. An article comprising a pigmented sheet of polyethylene plastic; a front surface on the sheet having minute pits and indentations therein, the pits and indentations beig sealed to prevent absorption of ink, providing a non-glossy, reflective surface suitable for use as a projection screen, said surface being adapted to receive and be wetted by a volatile fluid ink having low viscosity and having suspended therein essentially discrete particles of small size which when dried on said surface may be removed by an eraser of softer material than the surface so as not to cut or scratch the surface.

14. The combination called for in claim 13 with the addition of adhesive backing on the back surface of the sheet for securing the sheet to a supporting surface.

15. The combination called for in claim 13 wherein the sheet is pigmented white.

16. An article comprising a sheet of plastic material having sealed pores on the surface thereof, providing a non-glossy impervious reflective surface suitable for use as a movie projection screen, and which is adapted to receive and retain an ink marking, but said marking being removable therefrom by light abrasion by an erasure of softer material than the surface of the sheet.

References Cited
UNITED STATES PATENTS 2,910,723  10/1959  Travers _____ 117—138.8E ALFRED L. LEAVITT, Primary Examiner M. F. ESPOSITO, Assistant Examiner U.S. Cl. X.R.
117—38, 138.8; 35—66